United States Patent
Lewison et al.

(10) Patent No.: US 10,764,067 B2
(45) Date of Patent: Sep. 1, 2020

(54) OPERATION OF A CERTIFICATE AUTHORITY ON A DISTRIBUTED LEDGER

(71) Applicants: Karen Pomian Lewison, Carmichael, CA (US); Francisco Corella, Carmichael, CA (US)

(72) Inventors: Karen Pomian Lewison, Carmichael, CA (US); Francisco Corella, Carmichael, CA (US)

(73) Assignee: Pomian & Corella, LLC, Sacramento, CA (US)

( * ) Notice: Subject to any disclaimer, the term of this patent is extended or adjusted under 35 U.S.C. 154(b) by 359 days.

(21) Appl. No.: 15/599,249

(22) Filed: May 18, 2017

(65) Prior Publication Data

US 2017/0338967 A1    Nov. 23, 2017

Related U.S. Application Data

(63) Continuation-in-part of application No. 15/468,100, filed on Mar. 23, 2017.

(60) Provisional application No. 62/364,248, filed on Jul. 19, 2016, provisional application No. 62/408,774, filed on Oct. 15, 2016, provisional application No.
(Continued)

(51) Int. Cl.
| | | |
|---|---|---|
| H04L 9/32 | (2006.01) | |
| H04L 9/06 | (2006.01) | |
| H04L 9/14 | (2006.01) | |
| H04L 9/30 | (2006.01) | |

(52) U.S. Cl.
CPC .......... *H04L 9/3268* (2013.01); *H04L 9/0643* (2013.01); *H04L 9/14* (2013.01); *H04L 9/30* (2013.01); *H04L 9/3236* (2013.01)

(58) Field of Classification Search
None
See application file for complete search history.

(56) References Cited

U.S. PATENT DOCUMENTS 5,982,898 A * 11/1999 Hsu .................. H04L 9/321
713/156
6,085,320 A * 7/2000 Kaliski, Jr. ............ G06F 21/33
713/168
(Continued)

OTHER PUBLICATIONS

Internet Engineering Task Force (IETF), D. Cooper et al. Internet X.509 Public Key Infrastructure Certificate and Certificate Revocation List (CRL) Profile, May 2008. Published online at https://www.ieff.org/rfc/rfc5280.txt.
(Continued)

*Primary Examiner* — Jason Chiang

(57) ABSTRACT

An on-ledger certificate authority operates a node of a distributed ledger that controls a certificate issuance store and a certificate revocation store. When the certificate authority issues a certificate, the node issues a ledger transaction with an instruction to store a validation hash of the certificate in the issuance store, and when a certificate is revoked, a ledger transaction with an instruction to store the serial number of the certificate in the revocation store. As such transactions propagate throughout the ledger, the instructions are executed by on-ledger verifiers in their local replicas of the stores. An on-ledger verifier validates a certificate by verifying that its serial number is not in the revocation store while its validation hash is in the verifier's replica of the issuance store.

10 Claims, 13 Drawing Sheets

Related U.S. Application Data

62/364,239, filed on Jul. 19, 2016, provisional application No. 62/340,395, filed on May 23, 2016.

(56) References Cited

U.S. PATENT DOCUMENTS

| | | | |
|---|---|---|---|
| 7,065,643 B1* | 6/2006 | Cornils | H04L 9/0822 380/273 |
| 7,209,563 B1* | 4/2007 | Calvez | H04L 9/0836 380/277 |
| 9,544,153 B1* | 1/2017 | Roskind | H04L 63/0428 |
| 9,679,276 B1* | 6/2017 | Cuende | G06Q 20/065 |
| 2001/0032310 A1* | 10/2001 | Corella | H04L 9/002 713/156 |
| 2005/0086468 A1* | 4/2005 | Meandzija | H04L 63/0428 713/156 |
| 2005/0120207 A1* | 6/2005 | Hines | H04L 9/006 713/158 |
| 2008/0034204 A1* | 2/2008 | Lakshminarayanan | H04L 63/0823 713/158 |
| 2008/0065778 A1* | 3/2008 | Deishi | H04L 63/0823 709/229 |
| 2008/0126805 A1* | 5/2008 | Owlett | H04L 9/3236 713/176 |
| 2009/0260057 A1* | 10/2009 | Laberteaux | H04L 63/0823 726/2 |
| 2010/0250922 A1* | 9/2010 | Bao | H04L 63/0823 713/158 |
| 2011/0210973 A1* | 9/2011 | Di Crescenzo | H04L 41/142 345/440 |
| 2015/0188945 A1* | 7/2015 | Kjeldaas | H04L 63/20 726/1 |
| 2015/0235042 A1* | 8/2015 | Salehpour | G06F 21/6218 726/4 |
| 2016/0191243 A1* | 6/2016 | Manning | H04L 61/1511 713/168 |
| 2017/0006022 A1* | 1/2017 | Gunti | H04L 63/0823 |
| 2017/0012943 A1* | 1/2017 | Kaliski, Jr. | H04L 63/0428 |
| 2017/0147808 A1* | 5/2017 | Kravitz | G06F 21/45 |
| 2017/0324750 A1* | 11/2017 | Khan | H04L 63/123 |
| 2018/0006826 A1* | 1/2018 | Smith | H04L 9/3268 |
| 2018/0102904 A1* | 4/2018 | Lin | G06F 21/53 |
| 2018/0227293 A1* | 8/2018 | Uhr | G06Q 20/36 |
| 2019/0005470 A1* | 1/2019 | Uhr | H04L 9/3265 |
| 2019/0074982 A1* | 3/2019 | Hughes | H04L 9/3268 |

OTHER PUBLICATIONS

Emercoin International Development Group, EMCSSL Decentralized identity management, passwordless logins, and client SSL certificates using Emercoin NVS. May 19, 2015. Published online at https://emercoin.com/content/EMCSSL.pdf.

\* cited by examiner

OPERATION OF A CERTIFICATE AUTHORITY ON A DISTRIBUTED LEDGER

CROSS-REFERENCE TO RELATED APPLICATIONS

This application claims priority to U.S. Provisional Patent Application No. 62/364,248 (filed on Jul. 19, 2016), and is a continuation in part of U.S. Non-Provisional patent application Ser. No. 15/468,100 (filed on Mar. 23, 2017), which claims priority to U.S. Provisional Patent Applications No. 62/408,774 (filed on Oct. 15, 2016), No. 62/364,239 (filed on Jul. 19, 2016) and No. 62/340,395 (filed on May 23, 2016), all of which applications are incorporated herein by reference.

GOVERNMENT SUPPORT

This invention was made with Government support under the SBIR Phase I Contract No. HSHQD-16-C-00052 awarded by the Department of Homeland Security. The Government has certain rights in this invention.

BACKGROUND

A certificate authority (CA) issues certificates to subjects, which may be humans or entities such as server computers. A certificate issued to a subject certifies that the subject has some attributes, allowing the subject to prove that it/she/he has such attributes to a third-party, hereinafter referred to as a verifier, that may have no prior relationship with the subject but trusts the CA. A traditional certificate, such as an X.509 certificate described in the Internet Engineering Task Force (IETF) Request for Comments (RFC) 5280 available at https://www.ietf.org/rfc/rfc5280.txt, comprises a public key, attributes, metadata including data items such as a validity period, a serial number, etc., and a signature by the CA. The public key is associated with a private key owned by the subject, the public and private keys forming a key pair pertaining to a public key cryptosystem. The signature binds the public key to the attributes, allowing the subject to demonstrate to the verifier that it/she/he has the attributes by proving possession of the private key.

Before relying on the certificate the verifier must validate it, which requires verifying that it was issued by the CA and has not been revoked. But the validation methods made available by a traditional CA have drawbacks.

Traditionally, a CA revokes a certificate by including its serial number in a certificate revocation list (CRL) signed by the CA, or by configuring an Online Certification Status Protocol (OCSP) server to respond that the certificate has been revoked when queried, or both. Using a CRL has the drawback that it requires the verifier to periodically obtain CRL updates, which is onerous. Relying on a OCSP server prevents the verifier from validating the certificate when the OCSP server is offline, and adds network latency to the presentation of the certificate. The latency impact can be mitigated by a technique known in the art as OCSP stapling when the subject of the certificate is a busy web server, but not when the subject is a human user operating a web browser.

Traditionally, the verifier relies on the signature included in the certificate by the CA to verify that the certificate was issued by the CA. But the presence of the signature in the certificate substantially increases the size of the certificate, which further adds latency when the certificate is presented by the subject to the verifier over a network with limited bandwidth.

Therefore there is a need for non-traditional CAs that support better methods of validating certificates.

SUMMARY

In one embodiment, a CA operates a node of a distributed ledger with on-ledger storage that issues ledger certificates that can be validated without verifying a certificate signature and without relying on a CRL distribution point or OCSP responder to check for revocation. When a ledger certificate is issued, the node issues a ledger transaction with an instruction to store a validation hash of the certificate in a certificate issuance store, and when a ledger certificate is revoked, the node issues a ledger transaction with an instruction to store the serial number of the certificate in a certificate revocation store, both stores being on-ledger stores controlled by the CA. As the transactions propagate throughout the ledger, the instructions are executed by on-ledger verifiers in their local replicas of the stores. A verifier can thus validate a ledger certificate by verifying that the validation hash of the certificate is in the verifier's replica of the CA's certificate issuance store, and the serial number is not in the verifier's replica of the CA's certificate revocation store. A ledger certificate can optionally include a signature, a URL of a CRL distribution point, and a URL of an OCSP responder to enable an off-ledger to validate the ledger certificate by conventional means. If the signature is included, it may be omitted when the certificate is presented to an on-ledger verifier.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Reference numerals consist of a concatenation of a one- or two-digit number referring to a figure, followed by a two-digit number that locates the referenced part within the figure. A reference numeral introduced in a figure may be used in other figures to refer to the same part or a similar part.

DETAILED DESCRIPTION

Figure 1:
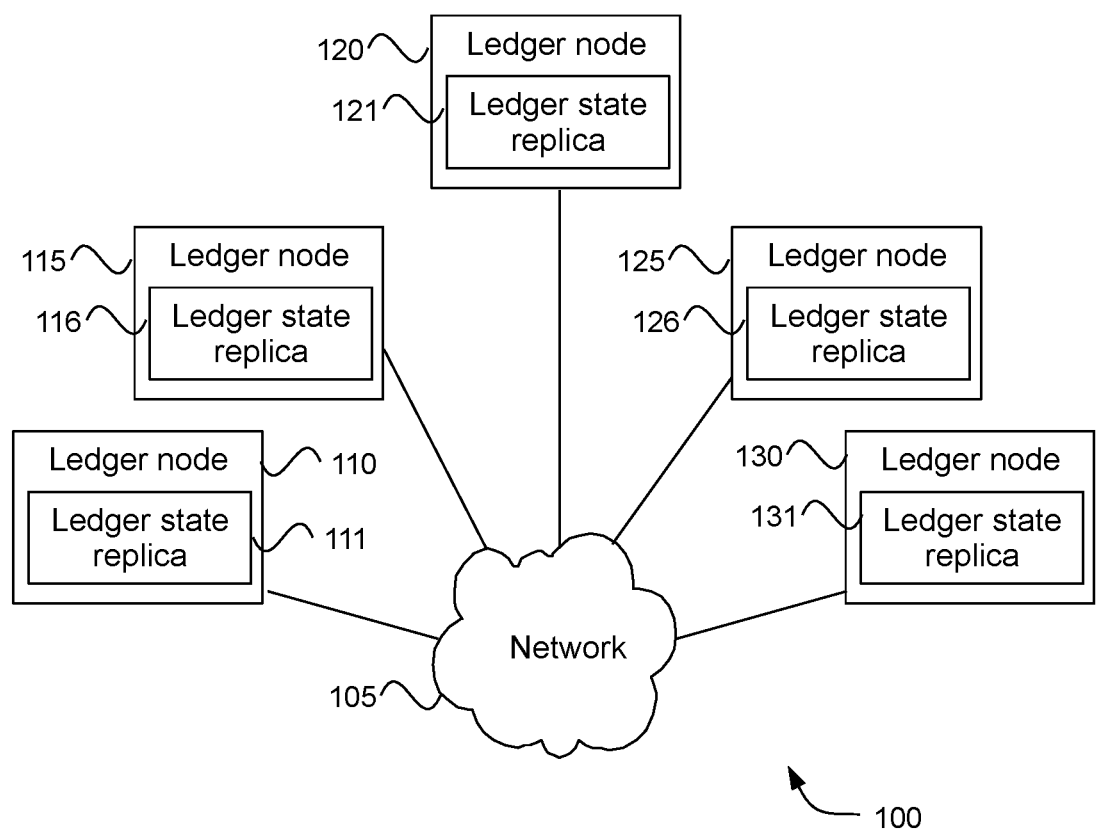
FIG. 1 is a block diagram illustrating a distributed ledger that provides on-ledger storage.

This Detailed Description refers to the accompanying drawings, which are a part hereof and illustrate examples of embodiments of the invention. It is to be understood that other embodiments are possible, and that the features of different exemplary embodiments can be combined together unless otherwise stated.

A distributed ledger comprises a set of nodes that communicate over a network using a peer-to-peer communication protocol. Each node issues ledger transactions that propagate throughout the distributed ledger by the operation of the peer-to-peer protocol. Ledger transactions alter the state of the ledger, which is replicated across all nodes, each node having a local replica of the ledger state. A distributed consensus algorithm is used to achieve consensus among the nodes on the order of the ledger transactions. A blockchain is a distributed ledger in which ledger transactions are grouped into blocks created by nodes, and consensus on the ordering of the ledger transactions follows from consensus on the validity and ordering of the blocks.

Each transaction issued by a node of a distributed ledger is signed by a transaction-signing private key, which is a component of a transaction-signing key pair pertaining to a digital signature cryptosystem such as one of the RSA, DSA or ECDSA digital signature cryptosystems specified by the National Institute of Standards and Technology (NIST) in the Federal Information Processing Standard (FIPS) 186-4, or to an ECDSA cryptosystem based on one of curves specified in the Standard for Efficient Cryptography (SEC) 2 version 2.0 published by Certicom and available at http://www.secg.org/sec2-v2.pdf, such as the curve secp256k1 used by the Ethereum and Bitcoin blockchains. The transaction-signing key pair is generated by the node and the transaction-signing private key never leaves the node. In some embodiments a node may create multiple transaction-signing key pairs and may use different transaction-signing private keys to sign different transactions.

Some distributed ledgers provide on-ledger storage by allowing a ledger transaction to contain an instruction to store data in an abstract ledger store identified by a ledger address. As ledger transactions including such instructions are propagated to the nodes of the ledger through the peer-to-peer protocol, each node executes the instruction locally, on a local replica of the abstract ledger store that is part of the node's local replica of the ledger state.

In the Ethereum blockchain, for example, it is possible to implement on-ledger storage by means of a "contract account". A node can create an "external account" associated with a transaction-signing key pair, and issue Ethereum transactions that are deemed to originate from the external account if they are signed by the private key component of the transaction-signing key pair. The node can then issue an Ethereum transaction originating from the external account, i.e. signed by the private key component of the associated key pair, to create a "contract account" having an associated key-value store (where the word "key" has its database meaning rather than its cryptographic meaning) and having associated Ethereum Virtual Machine (EVM) code that provides an API that can be used by Ethereum transactions to access the store. The Ethereum address of the contract account serves as the ledger address of the store. To add a key-value pair to the store, the node uses the transaction-signing private key to sign an Ethereum transaction containing a "message call" from the externally owned account to the contract account, instructing the EVM code in the contract account to store the key-value pair.

FIG. 1 is a block diagram illustrating a distributed ledger 100 that provides on-ledger storage according to some embodiments. The ledger comprises a collection of ledger nodes, which are computers that communicate over a network 105 such as the Internet or an organization's intranet using a peer-to-peer communication protocol. Five nodes are shown in the illustration of FIG. 1, nodes 110, 115, 120, 125 and 130, but a typical ledger will have a larger number of nodes. Each node has a local replica of the ledger state. Nodes 110, 115, 120, 125 and 130 have ledger state replicas 111, 116, 121, 126 and 131 respectively.

Some distributed ledgers more specifically allow a node to issue a ledger transaction that creates an abstract ledger store containing an unordered set of items within the replicated ledger state, and then issue ledger transactions with instructions to add items to the set, in such a way that a ledger transaction that adds an item is deemed valid only if it is signed by the same transaction-signing private key that was used to sign the transaction that created the store. Since the private key never leaves the node, only the node can issue such valid transactions. Such an abstract store will be referred to herein as an unordered store controlled by the node.

The on-ledger storage mechanism of Ethereum described above can be used to emulate an unordered store of items controlled by a node by means of the key-value store associated with a contract account. An item is added to the unordered store by adding a key-value pair to the key-value store, where the key is the item and the value is 1. The EVM code in the contract account can be programmed to check the origin of the Ethereum transaction containing the message call to store the key-value pair and reject the transaction as invalid unless it originates from the external account that created the contract account, which means that it is signed by the same transaction-signing private key that was used to sign the transaction that created the contract account whose associated key-value store emulates the unordered store.

Hereinafter, when referring to a distributed ledger with on-ledger storage it will be implicitly assumed that the ledger provides a mechanism allowing a node to create an unordered store that it controls, and when referring to a ledger store created by a node it should be understood that it is an unordered store controlled by the node.

A CA is said herein to operate on a distributed ledger with on-ledger storage if it operates a node of the ledger and issues certificates that can be validated using information provided by the ledger. Such certificates will be referred to herein as "ledger certificates", and such a CA as an "on-ledger CA". In some embodiments, a node operated by an on-ledger CA creates and controls two ledger stores: a "revocation store" where it stores serial numbers of certificates that it revokes, and an "issuance store" where it stores "validation hashes" of certificates that it issues, a validation hash of a certificate being a cryptographic hash of certain certificate data, as further explained below in connection with FIGS. 5, 6, 7 and 8, whose presence in the issuance store can be used to verify that the certificate was issued by the CA. The revocation and issuance stores may be used to validate the ledger certificates issued by the on-ledger CA by verifiers who operate ledger nodes. Such verifiers will be referred to herein as "on-ledger verifiers". In some embodiments, ledger certificates can also be validated by traditional means, allowing them to be accepted by verifiers that do not operate ledger nodes. Such verifiers will be referred to herein as "off-ledger verifiers".

Figure 2:
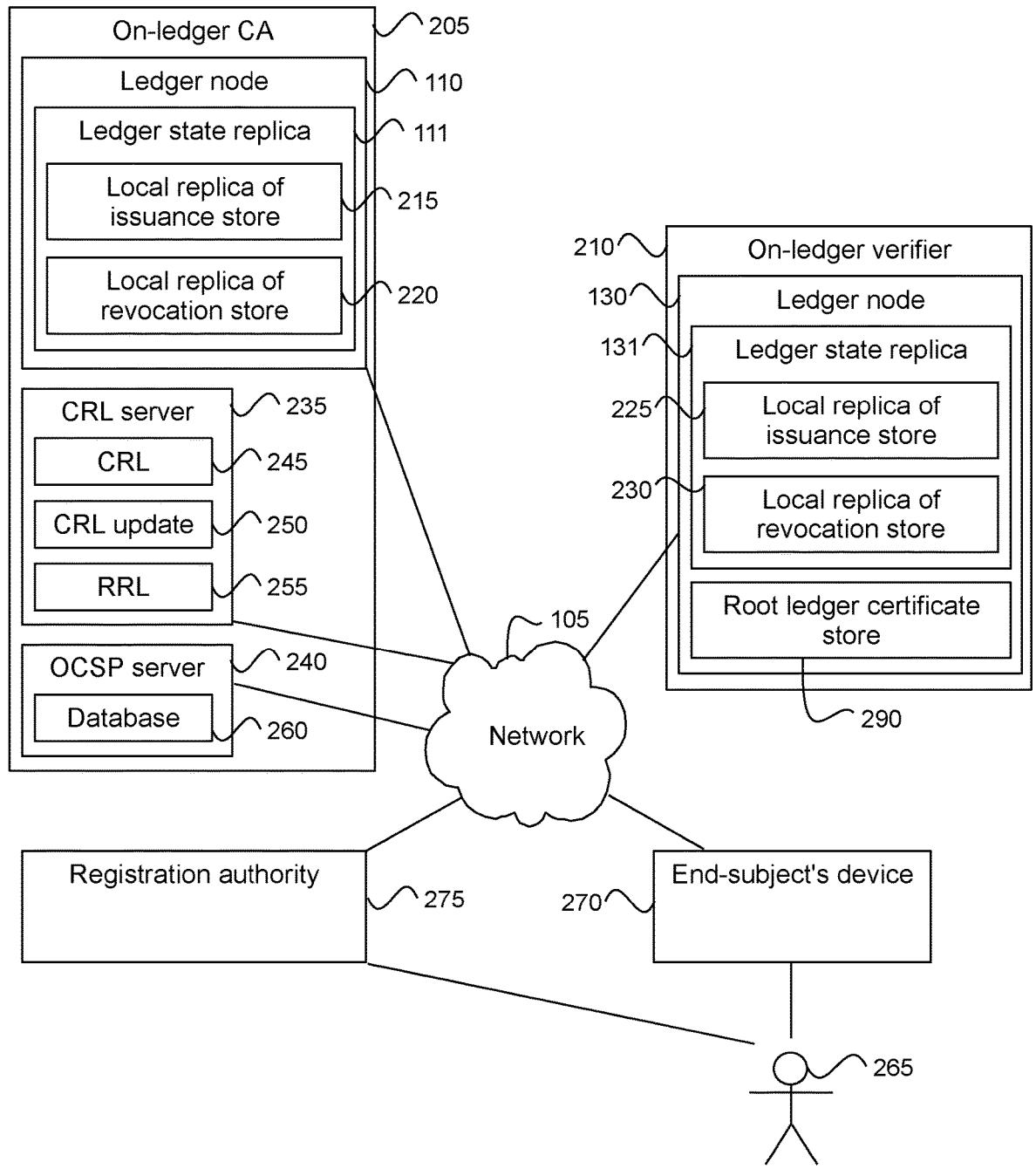
FIG. 2 is a block diagram illustrating an on-ledger CA and an on-ledger verifier operating on a distributed ledger.

FIG. 2 is a block diagram illustrating an on-ledger CA 205 and an on-ledger verifier 210 operating on the distributed ledger 100 of FIG. 1; only the relevant nodes of the ledger are shown in FIG. 1. CA 205 operates node 110 and verifier 210 operates node 130. The replica 111 of the ledger state in node 110 contains local replicas 215 and 220 of the issuance and revocation stores of the CA respectively. The replica 131 of the ledger state in node 130 also contains replicas 225 and 230 of the issuance and revocation stores of the CA. (Local replicas in a node operated by a verifier will be referred to as that verifier's local replicas.)

In the example of FIG. 2, CA 205 also operates a CRL server 235 and an OCSP server 240, in order to allow off-line verifiers to validate some of the certificates that it issues.

The CRL server provides a CRL distribution point, which is a Transmission Control Protocol (TCP) port through which off-line verifiers can retrieve CRLs and CRL updates. The CRL distribution point can be referenced by means of a Uniform Resource Locator (URL), which shall be called herein the CRL URL. The CRL server contains a CRL 245, a CRL update 250, and a Recent Revocation List (RRL) containing a list of serial numbers of recently revoked certificates 255. With a certain periodicity, such as once a day: (i) the serial numbers in the CRL update are added to the CRL, and the resulting list, signed by the CA 205, becomes the new CRL; (ii) the RRL is signed by the CA and becomes the new CRL update; and (iii) the RRL is cleared.

The OCSP server provides an OCSP responder endpoint, which is a TCP port through which off-line verifiers can retrieve signed responses to OCSP queries. The OCSP responder endpoint can be referenced by means of a URL that shall be called herein the OCSP URL. The OCSP server contains a database 260 of serial numbers of non-expired certificates issued by the CA 205, which indicates for each serial number whether the corresponding certificate has been revoked or is still valid.

In some embodiments there is a hierarchy of on-ledger CAs, where each on-ledger CA may issue ledger certificates to CAs or to subjects that are not CAs, herein called "end-subjects". Ledger certificates issued to CAs will be referred to herein as "CA ledger certificates", and ledger certificates issued to end-subjects will be referred to herein as "end-subject ledger certificates". The ledger certificate of an on-ledger CA will be said to be the "parent certificate" of the ledger certificates issued by the on-ledger CA. In the context of a first on-ledger CA issuing a ledger certificate to a second on-ledger CA, the first and second on-ledger CAs will be referred to as the parent and child CAs respectively.

Each end-subject certificate has a ledger certificate validation chain where the first certificate is the end-subject certificate, each certificate but the last has been issued by the CA that is the subject of the next certificate, and the last certificate in the chain is a root ledger certificate, i.e., a generally known certificate self-issued by a root ledger CA. Since the root ledger certificate is generally known, it may be omitted. The node 130 operated by the on-ledger verifier 210 has a root ledger certificate store 290 containing the generally known root ledger certificates of root ledger CAs.

In the example of FIG. 2, CA 205 issues a ledger certificate to a human end-subject 265 operating a personal computing device 270 such as a desktop or laptop computer, a tablet, or a smart phone (hereinafter, "the end-subject's device"). The end-subject uses the certificate to prove his/her identity to verifier 210. The end-subject's device communicates with the nodes 110 and 130 over the same network 105 used for peer-to-peer communication between the nodes of the ledger. In the example of FIG. 2, CA 205 relies on a registration authority (RA) 275 for help with registration. In some embodiments, the end-subject visits the RA in-person and provides documentation of attributes which the RA verifies on behalf of the CA. If the ledger certificate to be issued to the end-subject is a rich ledger certificate, as described below, the end-subject also provides enrollment biometric samples to be used in constructing the certificate. The RA provides a security code to the end-subject, which the end-subject submits to the CA when requesting issuance of the certificate and the CA uses to retrieve verified attributes of the end-subject through a secure connection over the network 105, as well as, if applicable, the biometric samples provided by the subject.

Figure 3:
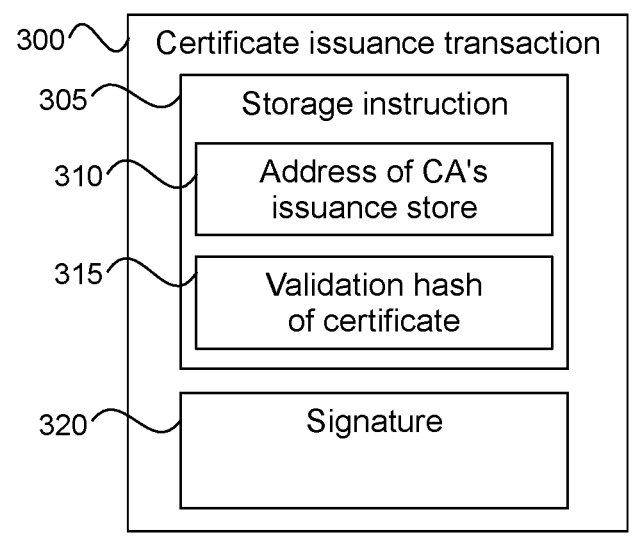
FIG. 3 is a block diagram illustrating a ledger transaction issued by a node operated by a CA when the CA issues a ledger certificate.

FIG. 3 is a block diagram illustrating a ledger transaction 300 issued by the node 110 of the distributed ledger 100 operated by the on-ledger CA 205 when the CA issues a ledger certificate, according to some embodiments. Such a ledger transaction will be referred to hereinafter as a "certificate issuance transaction". The certificate issuance transaction 300 comprises a storage instruction 305 that specifies the ledger address 310 of the CA's issuance store and the validation hash 315 of the certificate to be stored in the issuance store. The certificate issuance transaction also comprises a signature 320 computed on the contents of the transaction using the same transaction-signing private key that was used to issue the ledger transaction that created the CA's issuance store. After it is issued by the node 110 operated by the on-ledger CA 205, the certificate issuance transaction 300 propagates to the node 130 operated by the on-ledger verifier 210, which causes the node 130 to store the validation hash in its own local replica 225 of the issuance store of the CA 205.

Figure 4:
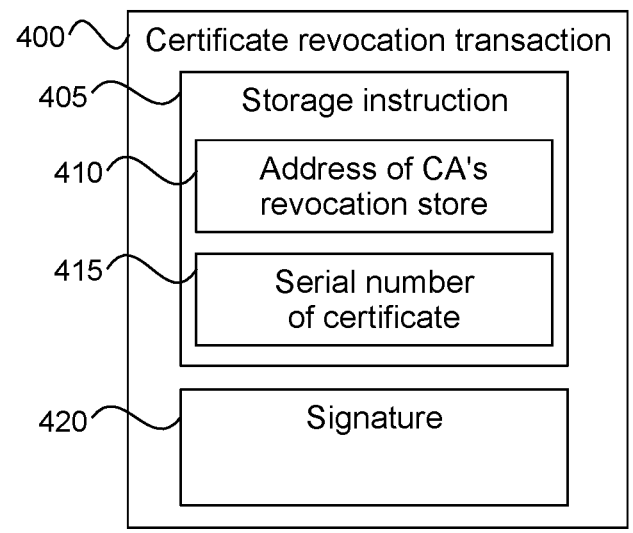
FIG. 4 is a block diagram illustrating a ledger transaction issued by a node operated by a CA when the CA revokes a ledger certificate.

FIG. 4 is a block diagram illustrating a ledger transaction 400 issued by the node 110 of the distributed ledger 100 operated by the on-ledger CA 205 when the CA revokes a ledger certificate, according to some embodiments. Such a ledger transaction will be referred to hereinafter as a "certificate revocation transaction". The certificate revocation transaction 400 comprises a storage instruction 405 that specifies the ledger address 410 of the CA's revocation store and the serial number 415 of the certificate to be stored in the revocation store. The certificate revocation transaction also comprises a signature 420 computed on the contents of the transaction using the same transaction-signing private key that was used to issue the ledger transaction that created the CA's revocation store. After it is issued by the node 110 operated by the on-ledger CA 205, the certificate revocation transaction 400 propagates to the node 130 operated by the on-ledger verifier 210, which causes the node 130 to store the serial number in its own local replica 225 of the revocation store of the CA 205.

Figure 5:
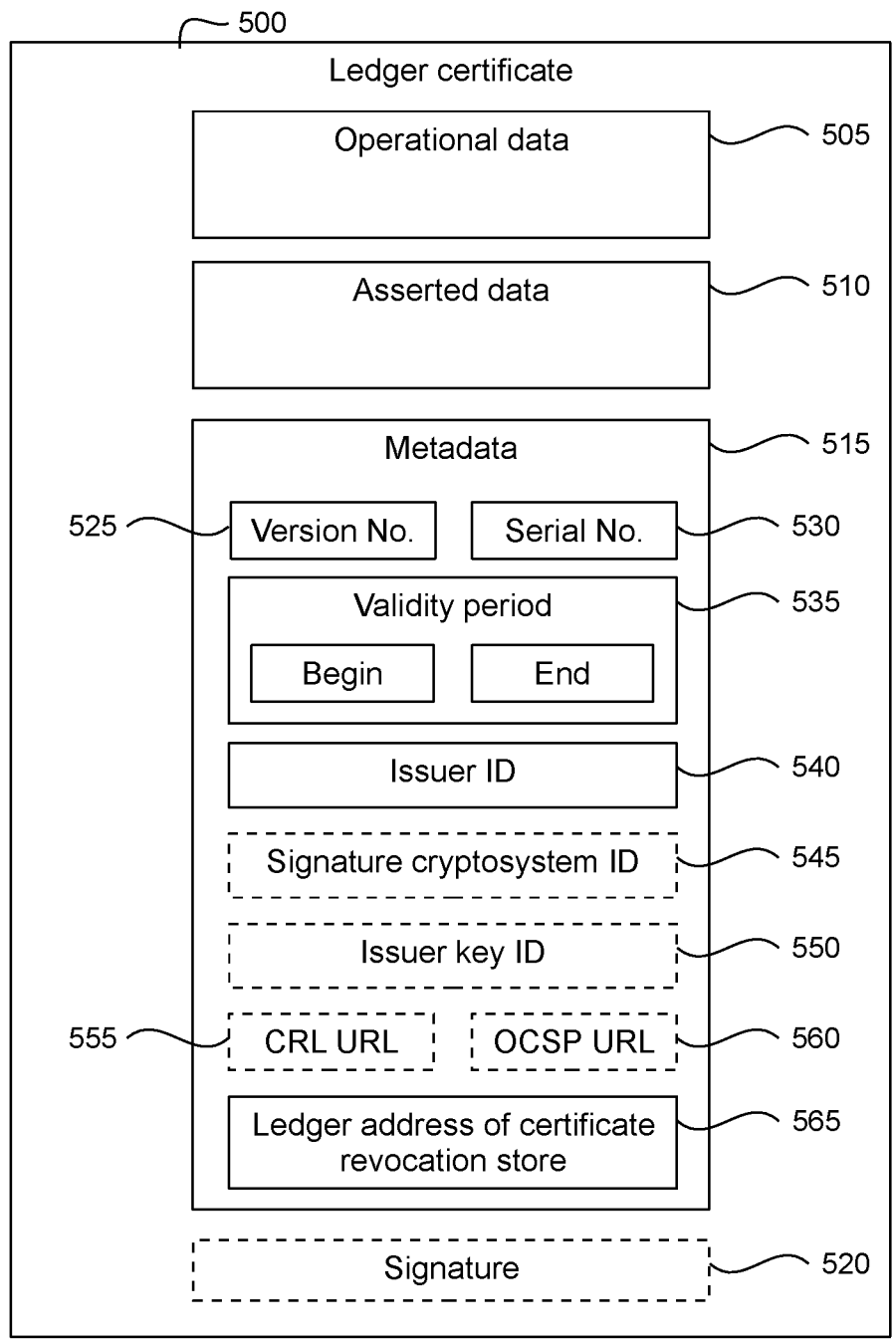
FIG. 5 is a block diagram illustrating a ledger certificate issued by an on-ledger CA.

FIG. 5 is a block diagram illustrating a ledger certificate 500 issued by an on-ledger CA, according to some embodiments. The ledger certificate comprises operational data 505, asserted data 510, metadata 515 and an optional signature 520 which, if present, has been computed by the CA using a certificate-signing key pair pertaining to a digital signature cryptosystem, which may or may not be the same as the cryptosystem of the transaction-signature key pair. Optional components of the ledger certificate such as the optional signature, are indicated by boxes with dashed-line borders.

The contents of the operational and asserted data depend on the kind of the certificate. They are described below in FIGS. 6, 7 and 8 for three different kinds of certificates. The metadata comprises a version No. component 525 that specifies the format of the certificate, a serial No. component 530 that uniquely identifies the certificate among those issued by the CA, a validity period 535, an issuer ID 540 that identifies the CA that issued the certificate, an optional signature cryptosystem ID 545 that identifies the digital signature cryptosystem that was used to compute the optional signature, an optional issuer key ID 550 that identifies the certificate-signing key pair whose private key component was used to compute the optional signature and whose public key component can be used to verify the signature among the certificate-signing key pairs that have been used or may be used in the future by the CA, an optional URL 555 of a CRL distribution point provided by the CA, an optional URL 560 of an OCSP responder endpoint provided by the CA, and the ledger address 565 of the CA's certificate revocation store. In some embodiments the issuer ID is a Distinguished Name as defined in recommendation X.501 of the International Telecommunication Union Telecommunication Standardization Sector (ITU-T). In some embodiments the issuer key ID is a cryptographic hash of the public key component of the certificate signing key pair.

To check whether the certificate has been revoked, an on-ledger verifier checks if the serial number found in the serial number component 530 is present in the verifier's local replica of the revocation store identified by the ledger address 565. The CRL URL 555 or the OCSP URL 560, if either is present, make it possible for an off-ledger verifier to check whether the certificate has been revoked by traditional means.

To verify that the certificate was issued by the on-ledger CA identified by the issuer ID 540, an on-ledger verifier can compute a "validation hash" of the certificate, and verify that it is present in the CA's certificate issuance store, whose ledger address can be found in the CA's own ledger certificate as shown below in FIG. 8. The validation hash is a cryptographic hash of a one-to-one encoding of critical certificate data. (An example of a one-to-one encoding is Abstract Syntax Notation One Distinguished Encoding Rules, ASN.1 DER.) The critical data used in the computation of the cryptographic hash depends on the kind of the certificate, as discussed below in connection with FIGS. 6, 7 and 8.

The signature 520, if present, is computed by performing a private key operation on the validation hash, using the certificate-signing private key identified by issuer key ID 550. The signature can be verified using the associated public key, which is included in the CA's ledger certificate, as shown below in FIG. 8. Verifying the signature is an alternative means of verifying that the certificate was issued by the CA, which is available to off-line verifiers.

If the optional components 520, 545, 550, 555 and 560 are present, the ledger certificate 500 can be verified by both on-ledger and off-ledger verifiers. Such a certificate is herein referred to as a "bimodal certificate". If those optional components are omitted, the ledger certificate 500 can only be verified by on-ledger verifiers. Such a certificate is referred to herein as a "ledger-only certificate". A subject may ask an on-ledger CA for a ledger-only or bimodal certificate depending on whether the subject expects to present the certificate to on-ledger verifiers only, or to both on-ledger and off-ledger certificates. A subject who obtains a bimodal certificate may omit the signature when presenting the certificate to an on-ledger verifier, in order to reduce the size of the certificate; but the subject may not remove the optional metadata components 545, 550, 555 and 560, because that would alter the validation hash of the certificate, as will become apparent below in connection with FIGS. 6, 7 and 8. The certificate that results from removing the signature of a bimodal certificate will be referred to herein as a "truncated certificate".

An on-ledger CA may issue end-subject ledger certificates, CA ledger certificates, or both. In some embodiments, an on-ledger CA that issues end-subject ledger certificates issues two kinds of them, called "plain end-subject ledger certificates" and "rich end-subject ledger certificates or, more simply "plain ledger certificates" and "rich ledger certificates. Rich ledger certificates are issued to human end-subjects, whereas plain ledger certificates may be used to human or other end-subjects.

Figure 6:
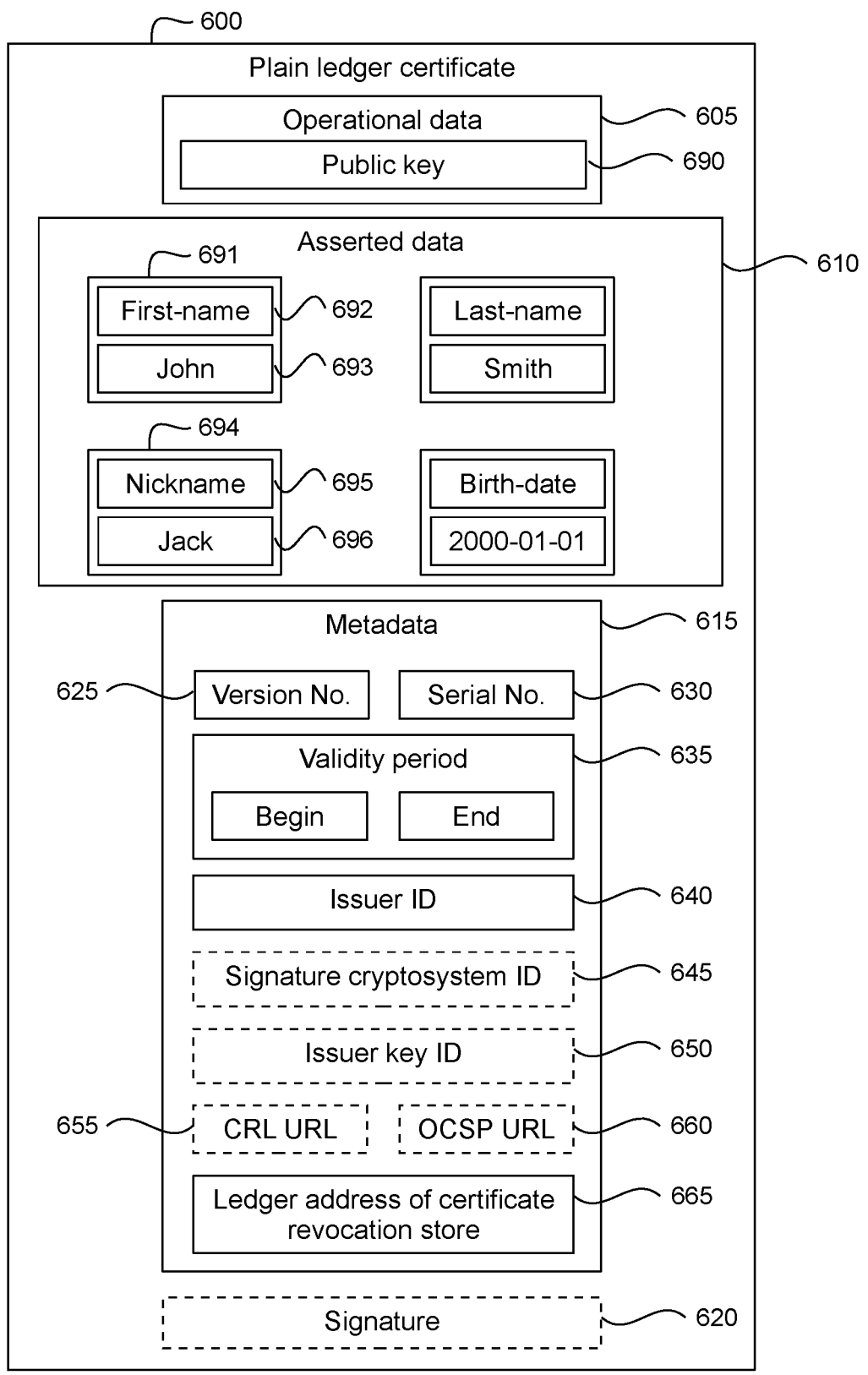
FIG. 6 is a block diagram illustrating a plain ledger certificate.

FIG. 6 is a block diagram illustrating a plain ledger certificate 600, issued by the CA 205 of FIG. 2 to the end-subject 265, according to some embodiments. The plain ledger certificate 600 is a special case of the ledger certificate 500 of FIG. 5. Like certificate 500, it comprises operational data 605, asserted data 610, metadata 615, and an optional signature 620.

In a plain ledger certificate the operational data 605 consists of an operational public key 690, which is the public key component of an operational key pair whose private key component is in the possession of the certificate's end-subject. The operational key pair may pertain to any kind of public key cryptosystem, and the end-subject may use the certificate and its associated private key for a variety of purposes. For example, the operational key pair may pertain to an encryption cryptosystem, and the end-subject may use the operational private key to decrypt messages encrypted with the operational public key contain in the certificate; or the operational key pair may pertain to a digital signature cryptosystem and the end-user may use the operational private key to sign documents with signatures that can be verified using the operational public key contained in the certificate; or the operational key pair may pertain to a digital signature or other cryptosystem and the end-user may use the certificate to prove his or her identity to a verifier by demonstrating knowledge of the operational private key.

In a plain ledger certificate the asserted data 610 comprises a collection of attributes, each comprising an attribute ID and an attribute value. The attribute IDs may be, e.g., object identifiers (OIDs) as defined in recommendation X.660 of the International Telecommunication Union Telecommunication Standardization Sector (ITU-T), or strings such as "First-name", "Last-name", "Nickname" or "Birthdate" as illustrated in the figure. Some of the attributes may have been verified to the satisfaction of the on-ledger CA, either by the CA itself or by an RA such as the RA 275 of FIG. 2, while other attributes may be self-asserted. For example attribute 691, whose attribute ID 692 is "First-name" and whose attribute value 693 is "John", may be a verified attribute, while attribute 694, whose attribute ID 695 is "Nickname" and whose attribute value 696 is "Jack", may be self-asserted.

The components of the metadata 615 are like those of the metadata 515 of certificate 500, corresponding metadata components in FIGS. 5 and 6 having reference numerals with the same last two digits.

The critical certificate data used in the computation of the validation hash of a plain ledger certificate, and hence in the computation of the optional signature 620 if present, consists of the operational data, the asserted data and the metadata, i.e. all data in the certificate except the signature.

Figure 7:
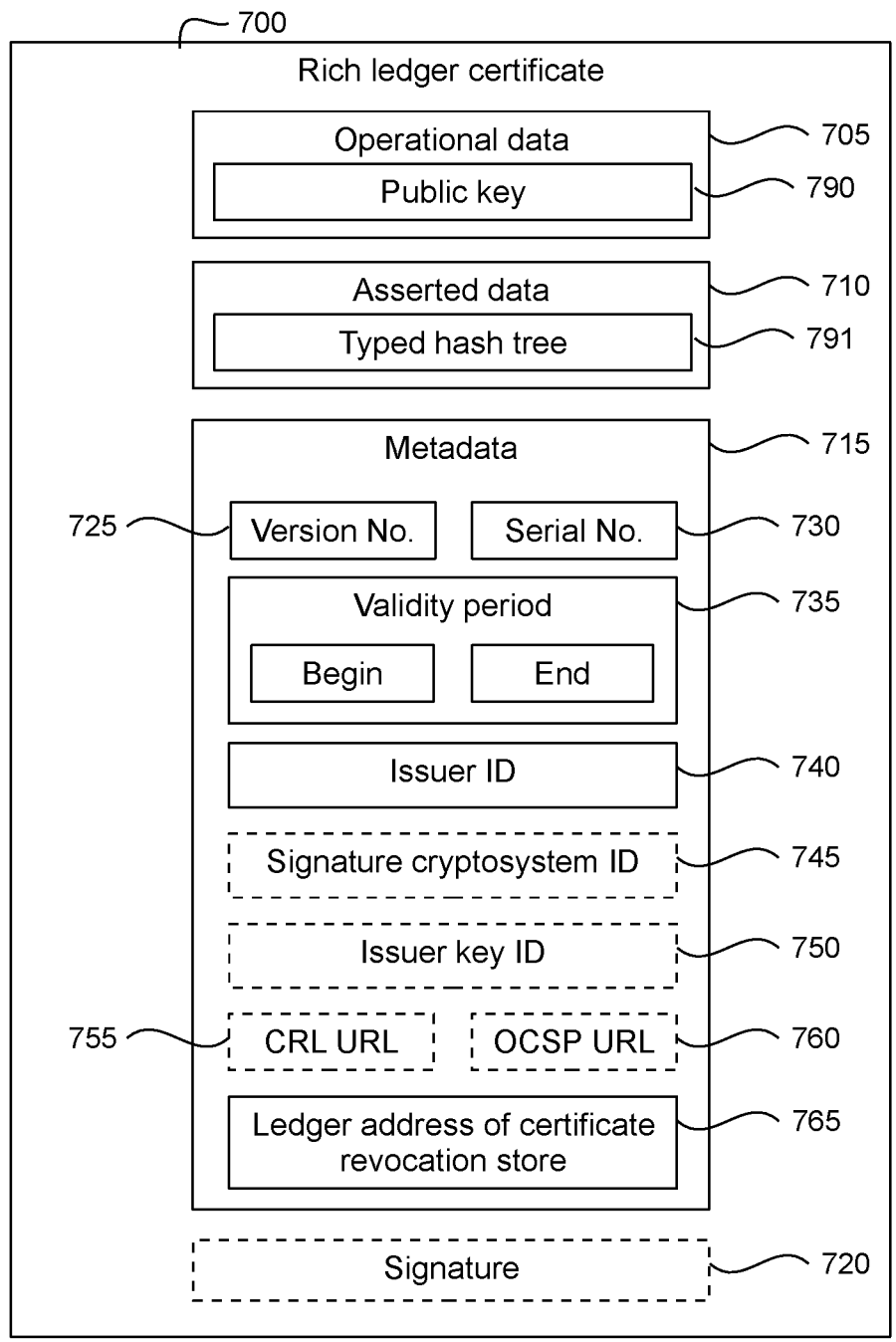
FIG. 7 is a block diagram illustrating a rich ledger certificate.

FIG. 7 is a block diagram illustrating a rich ledger certificate 700, issued by the CA 205 of FIG. 2 to the human end-subject 265 of FIG. 2, according to some embodiments. The rich ledger certificate 700 is a special case of the ledger certificate 500 of FIG. 5. Like certificate 500, it comprises operational data 705, asserted data 710, metadata 715, and an optional signature 720.

The rich ledger certificate 700 is similar to a rich certificate as defined in the earlier U.S. patent application Ser. No. 15/468,100 and illustrated in FIG. 4 of the earlier application, which will hereinafter be referred to as a "standard rich certificate". As explained in the earlier application, a standard rich certificate is the disclosable portion of a rich credential, hereinafter a "standard rich credential", which also comprises a secret portion comprising a private key and a secret salt. Similarly, a rich ledger certificate is the disclosable portion of a "rich ledger credential" whose secret portion comprises a private key and a secret salt, which in some embodiments are stored in the end-subject's device 270 of FIG. 2 of the present application.

The operational data of the rich ledger certificate 700 consists of a public key 790, which is the public key component of an operational key pair pertaining to a public key cryptosystem, whose private key component is the private key that is part of the secret portion of the rich ledger credential.

The asserted data of the rich end-subject certificate 700 consists of a rich-certificate typed hash tree 791, identical to the typed hash tree of a standard rich certificate and represented in the same way by a node array and a sparse label array as described in the earlier application. The typed hash tree 791, like the typed hash tree of a standard rich certificate, contains attributes, which may be verified or self-asserted, and verification data that allows the end-subject of the certificate, such as the end-subject 265 of FIG. 2, to present multiple verification factors to a verifier in the manner described in the earlier specification. The end-subject can prove knowledge of the private key, e.g. by signing a challenge with the private key. The end-subject can prove knowledge of a credential password, by sending a cryptographic hash of a password and the secret salt, and can submit biometric samples that the verifier verifies against biometric verification data contained in the typed hash tree, derived from enrollment samples previously submitted by the end-subject to the CA 205 or to an RA such as the RA 275 of FIG. 2.

The components of the metadata 715 are like those of the metadata 515 of certificate 500, corresponding metadata components in FIGS. 5 and 7 having reference numerals with the same last two digits.

Figure 8:
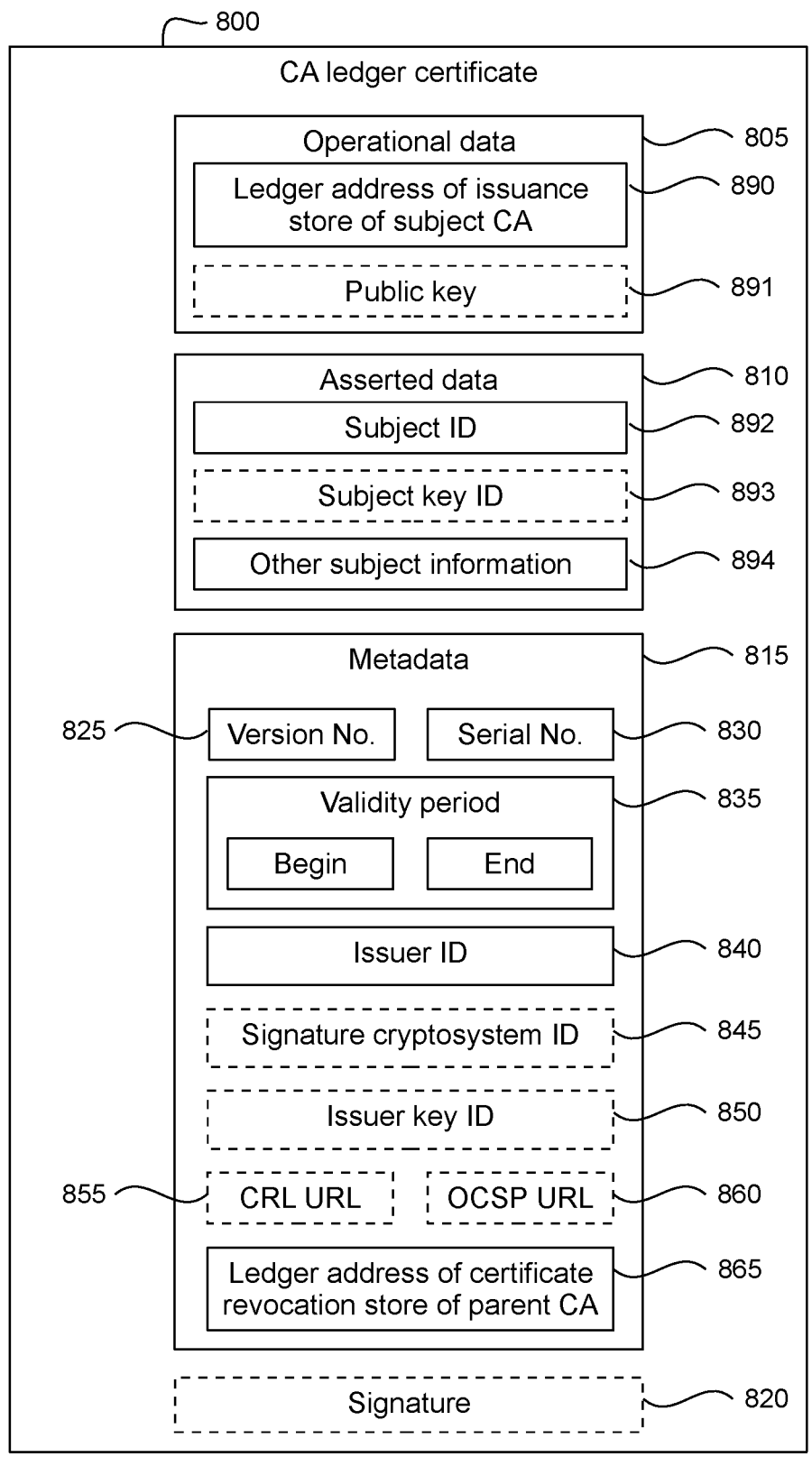
FIG. 8 is a block diagram illustrating a CA ledger certificate.

A rich-certificate typed hash tree goes through different states, as shown in FIG. 8 of the earlier application, in order to support selective disclosure of attributes and selective presentation of verification factors. Therefore the critical certificate data used in the computation of the validation hash of the rich ledger certificate 700 and the optional signature 720, if present, cannot include the entire typed hash tree 791. Instead it includes the root label of the typed hash tree, in addition to the public key 790 and the metadata 715.

FIG. 8 is a block diagram illustrating a CA ledger certificate 800 issued to the CA 205 of FIG. 2 by a parent CA, according to some embodiments. The CA ledger certificate 800 is a special case of the ledger certificate 500 of FIG. 5. Like certificate 500 it comprises operational data 805, asserted data 810, metadata 815 and an optional signature 820.

The operational data 805 comprises the ledger address 890 of the certificate issuance store of the subject CA, which can be used by on-ledger verifiers to look up the validity hashes of ledger certificates issued by the subject CA, and an optional certificate-signing public key 891.

The asserted data 810 comprises a subject ID 892 that identifies the on-ledger CA that is the subject of the certificate, an optional subject key ID 893, and other subject information 894, such as the legal name and the country of the subject CA. In some embodiments the subject ID is a Distinguished Name as defined in recommendation X.501 of the International Telecommunication Union Telecommunication Standardization Sector (ITU-T). The subject key ID, if present, identifies a particular certificate-signing key pair among those that the CA 205 has used or may use in the future. In some embodiments the subject key ID is a cryptographic hash of the certificate-signing public key, which is the public key component of said key pair. The public key 891, if present, is the certificate-signing public key. The public key and the subject key ID are included in bimodal certificates, and omitted in ledger-only certificates.

The components of the metadata 815 are like those of the metadata 515 of certificate 500, corresponding metadata components in FIGS. 5 and 8 having reference numerals with the same last two digits. It should be noted that two of the components of certificate 800, viz. components 890 and 865, are addresses of ledger stores, but the stores are controlled by different CAs. Component 890 is the ledger address of the certificate issuance store controlled by the subject CA, while component 865 is the ledger address of the certificate revocation store controlled by the parent of the subject CA.

Figure 9:
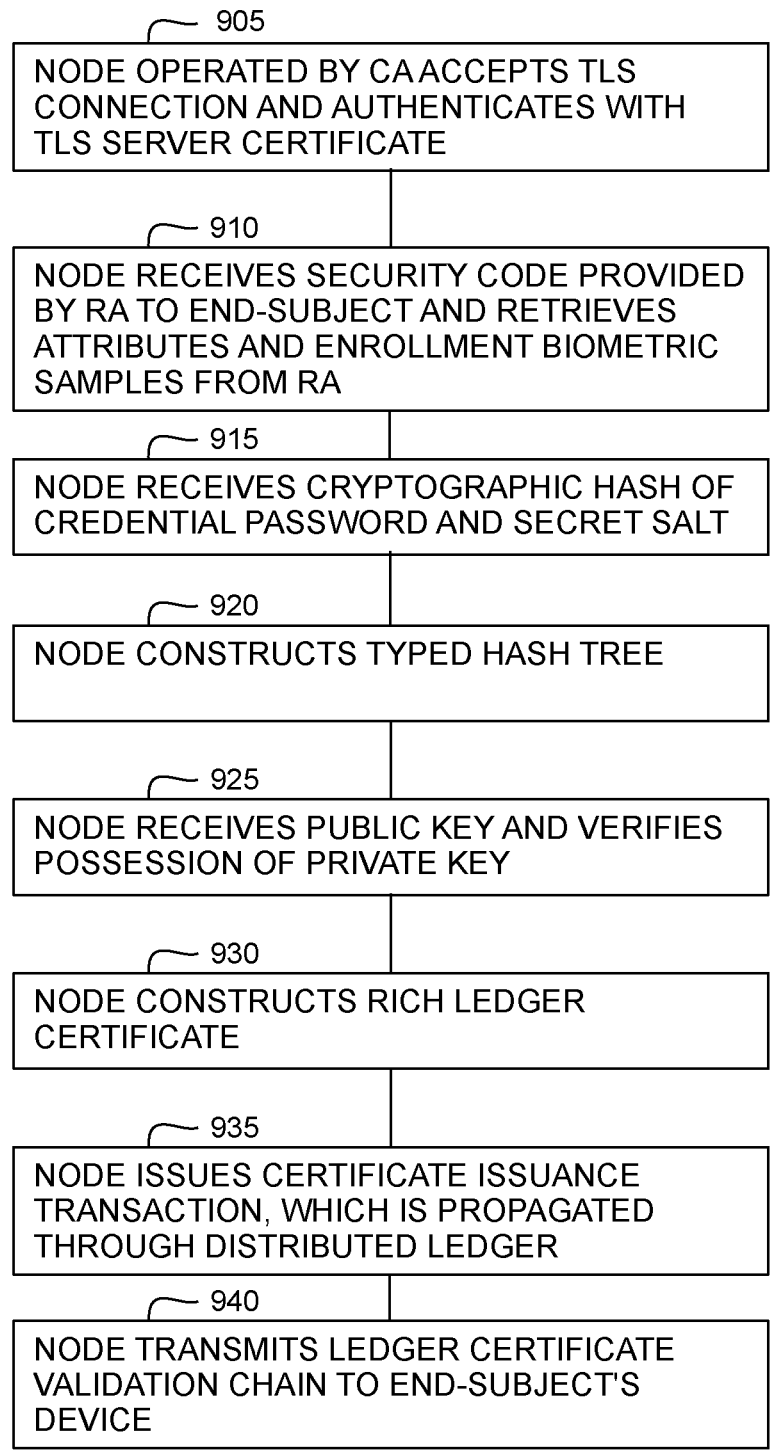
FIG. 9 is a flow diagram of a process followed by an on-ledger CA to issue a rich ledger certificate.

FIG. 9 is a flow diagram illustrating an issuance process 900 by which the on-ledger CA 205 of FIG. 2 issues the rich ledger certificate 700 of FIG. 7 to the human end-subject 265, according to some embodiments. The rich ledger certificate will become the disclosable portion of a rich ledger credential, whose secret portion will contain a private key and a secret salt. It is assumed that the end-subject 265 has requested a certificate that can be validated by both on-ledger and off-ledger verifiers, and the CA will accordingly deliver a bimodal certificate.

Prior to issuance, the end-subject has visited the RA 275, documented attributes that the RA has verified, provided self-asserted attributes, and provided biometric samples that will hereinafter be referred to as the "enrollment biometric samples". During the in-person visit the RA has given the end-subject a high-entropy security code that can be used to retrieve the attributes and the samples.

Prior to issuance the end-subject's device 270 has generated a key-pair pertaining to a public key cryptosystem and a secret salt. The private key component of the key pair and the secret salt will become the secret portion of the rich ledger credential.

The issuance process 900 comprises the following steps:

At 905 the node 110 operated by the CA 205 accepts a TLS connection from the end-subject's device 270. During the TLS handshake, the node 110 plays the role of TLS server and authenticates by sending a TLS server certificate containing an identifier such as a Domain Name System (DNS) domain name and proving knowledge of the associated private key. Then the process continues at 910.

At 910 the node 110 receives over the TLS connection the security code provided by the RA to the end-subject, and uses it to retrieve the attributes and the enrollment biometric samples from the RA. Then the process continues at 915.

At 915 the node 110 receives a cryptographic hash of a password chosen by the end-subject and the secret salt, to be used as the HoCPaSS (Hash of Credential Password and Secret Salt) in the typed hash tree component 791 of the rich ledger certificate as described in the earlier U.S. patent application Ser. No. 15/468,100. Then the process continues at 920.

Figure 14:
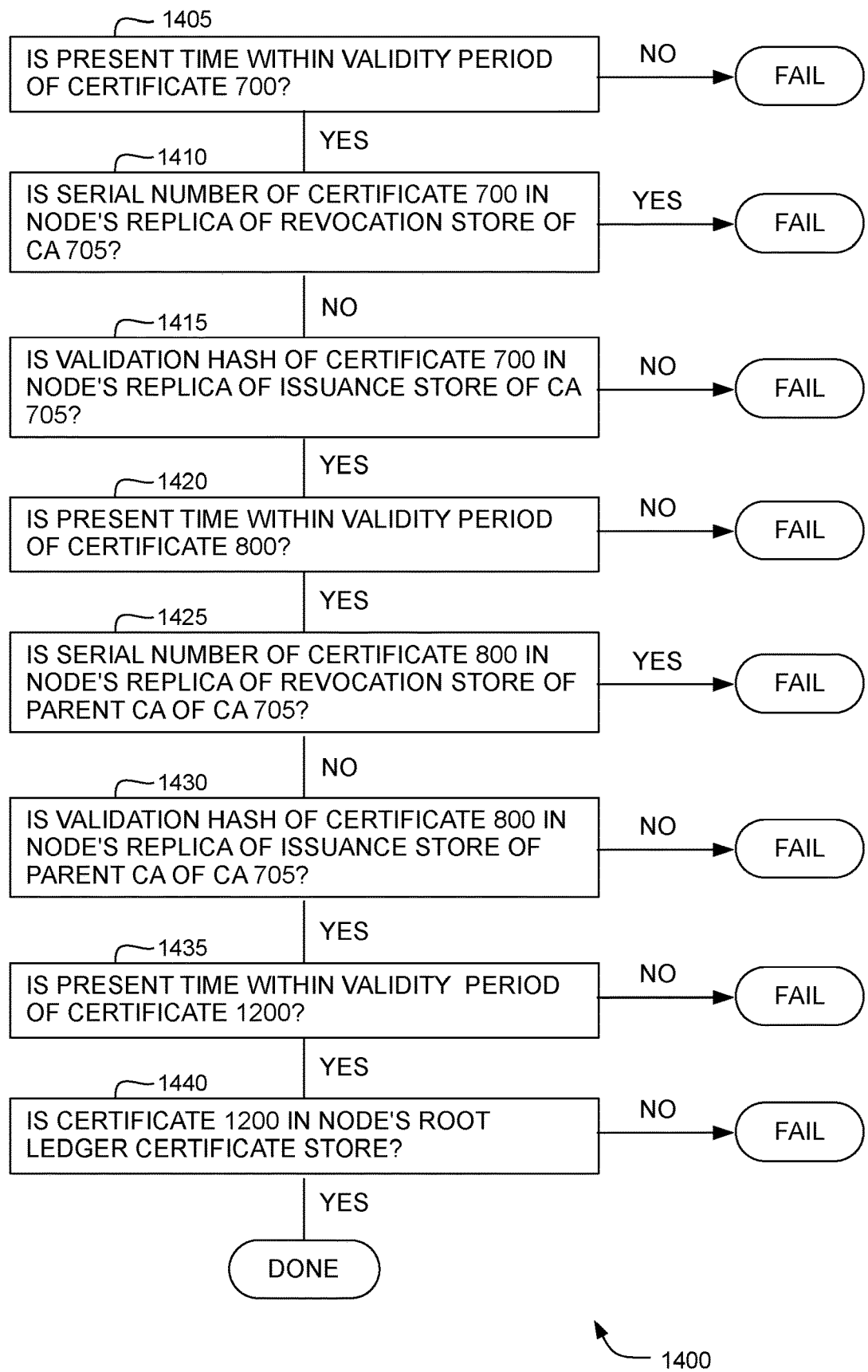
FIG. 14 is a flow diagram of a process followed by an on-ledger verifier to validate a ledger certificate using a ledger certificate validation chain.

At 920 the node 110 uses the attributes and biometric samples retrieved at 910 and the HoCPaSS received at 915 to construct a rich-certificate typed hash tree in its issuance state, then saves the root label of the tree before transitioning the tree to its storage state, as in consecutive steps steps 1440, 1445, 1450, 1455, 1460, 1465 and 1470 of process 1400 of FIG. 14 of the earlier application. Then the process continues at 925.

At 925 the node 110 receives the public key component of the key pair generated by the end-subject's device and verifies that the device possesses the associated private key in accordance with process 1700 of FIG. 17 of the earlier application, by sending a random nonce to the device, receiving a signature and a random nonce from the device, and using the received public key to verify that the signature has been computed with the associated private key on the sent nonce, the received nonce and the identifier included in the TLS server certificate. Then the process continues at 930.

At 930 the node 110 constructs the rich ledger certificate 700. The typed hash tree component 791 is as constructed and transitioned to the storage state at 920. The public key component 790 is the public key received at 925. The issuer ID 740 identifies the on-ledger CA 205. The ledger address component 765 is the ledger address of the certificate revocation store of the CA 205. The optional URL components 755 and 760 are included, and their values are the URL of the CRL distribution point provided by the CRL server 235 and the URL of the OCSP responder endpoint provided by the OCSP server 240 respectively. The optional signature component 720 is included, and is computed by performing a private key operation on a validation hash of the certificate, which is a one-to-one encoding of the public key component 790, the root label of the typed hash tree 791, and the metadata 715. The optional issuer key ID component 750 is included, and identifies the certificate signing key pair whose private key component was used by the CA 205 to sign the certificate by performing the private key operation on the validation hash. The optional signature cryptosystem ID component 745 is included, and uniquely identifies the cryptosystem of the certificate signing key pair. Other components are as described in connection with FIG. 7 and FIG. 5. Then the process continues at 935.

At 935 the node 110, which is a node of the distributed ledger 100, issues a certificate issuance transaction such as the transaction 300 of FIG. 3, which includes an instruction to store the validation hash of the rich ledger certificate 700 in the certificate issuance store of the CA 205, causing ledger nodes such as node 130 operated by verifier 210, to carry out the instruction and store the validation hash in their own replicas of the certificate issuance store as the transaction is propagated through the distributed ledger. Then the process continues at 940.

At 940 the node 110 transmits a ledger certificate validation chain to the end-user's device 270 over the TLS connection, comprising the rich ledger certificate 700, followed by the CA ledger certificate of the CA 205 and, if CA 205 is not a root ledger CA, by other CA ledger certificates as needed up to the self-issued certificate of a root ledger CA. Then process 900 terminates.

Figure 10:
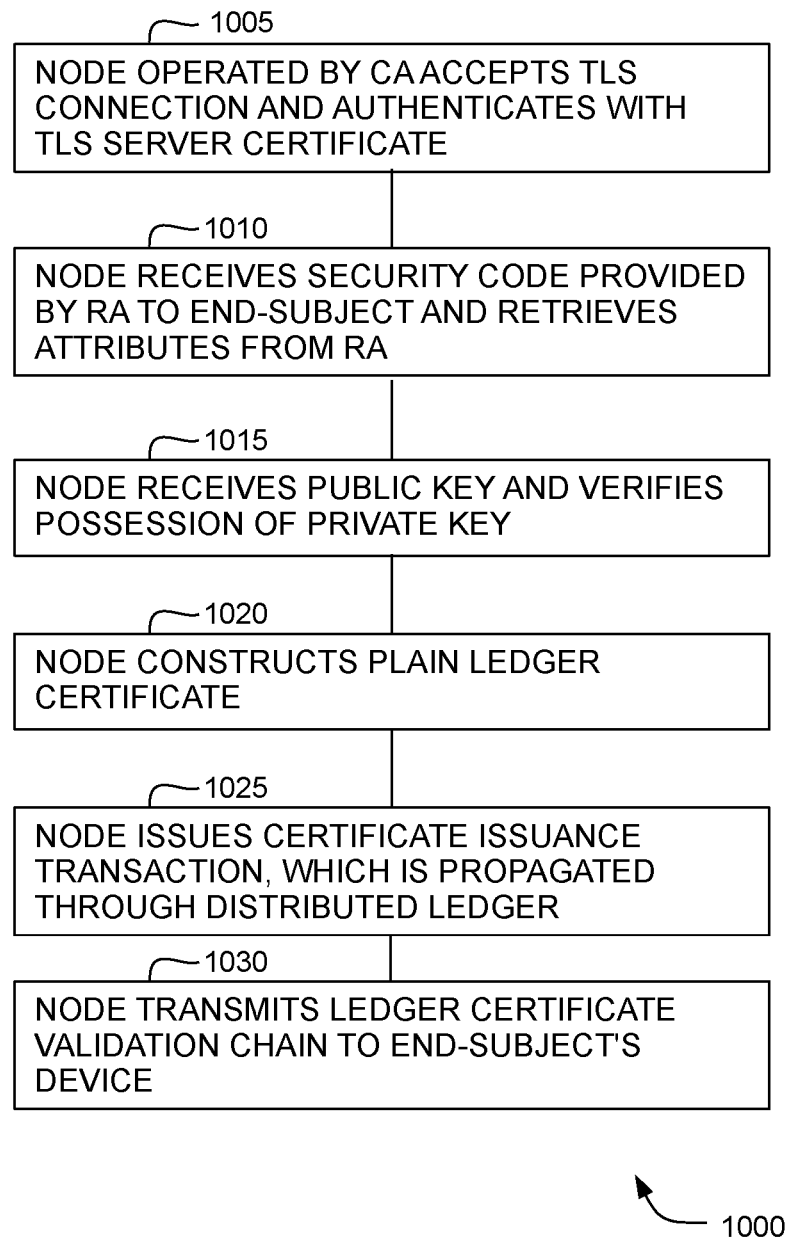
FIG. 10 is a flow diagram of a process followed by an on-ledger CA to issue a plain ledger certificate.

FIG. 10 is a flow diagram illustrating an issuance process 1000 by which the on-ledger CA 205 of FIG. 2 issues the plain ledger certificate 600 of FIG. 6 to the human end-subject 265, according to some embodiments. It is assumed that the end-subject 265 has requested a certificate that can be validated by both on-ledger and off-ledger verifiers, and the CA will accordingly deliver a bimodal certificate. Prior to issuance, the end-subject has visited the RA 275, documented attributes that the RA has verified, and provided self-asserted attributes. During the in-person visit the RA has given the end-subject a high-entropy security code that can be used to retrieve the attributes. Prior to issuance the end-subject's device 270 has generated a key-pair pertaining to a public key cryptosystem.

The issuance process 1000 comprises the following steps:

At 1005 the node 110 operated by the CA 205 accepts a TLS connection from the end-subject's device 270. During the TLS handshake, the node 110 plays the role of TLS server and authenticates by sending a TLS server certificate containing an identifier such as a Domain Name System (DNS) domain name and proving knowledge of the associated private key. Then the process continues at 1010.

At 1010 the node 110 receives over the TLS connection the security code provided by the RA to the end-subject, and uses it to retrieve the verified and self-asserted attributes from the RA. Then the process continues at 1015.

At 1015 the node 110 receives the public key component of the key pair generated by the end-subject's device and verifies that the device possesses the associated private key in accordance with process 1700 of FIG. 17 of the earlier application, by sending a random nonce to the device, receiving a signature and a random nonce from the device, and using the received public key to verify that the signature has been computed with the associated private key on the sent nonce, the received nonce and the identifier included in the TLS server certificate. Then the process continues at 1020.

At 1020 the node 110 constructs the plain ledger certificate 600. The public key component 690 is the public key received at 1015. The asserted data 610 comprises the attributes received from the RA 275 at 1010, first name, last name, nickname and birth date being examples of such attributes. The issuer ID 640 identifies the on-ledger CA 205. The ledger address component 665 is the ledger address of the certificate revocation store of the CA 205. The optional URL components 655 and 660 are included, and their values are the URL of the CRL distribution point provided by the CRL server 235 and the URL of the OCSP responder endpoint provided by the OCSP server 240 respectively. The optional signature component 620 is included, and is computed by performing a private key operation on a validation hash of the certificate, which is a one-to-one encoding of the public key component 690, the attributes that comprise the asserted data 610, and the metadata 615. The optional issuer key ID component 650 is included, and identifies the certificate signing key pair whose private key component was used by the CA 205 to sign the certificate by performing the private key operation on the validation hash. The optional signature cryptosystem ID component 645 is included, and uniquely identifies the cryptosystem of the certificate signing key pair. Other components are as described in connection with FIG. 6 and FIG. 5. Then the process continues at 1025.

At 1025 the node 110, which is a node of the distributed ledger 100, issues a certificate issuance transaction such as the transaction 300 of FIG. 3, which includes an instruction to store the validation hash of the plain ledger certificate 600 in the certificate issuance store of the CA 205, causing ledger nodes such as node 130 operated by verifier 210, to carry out the instruction and store the validation hash in their own replicas of the certificate issuance store as the transaction is propagated through the distributed ledger. Then the process continues at 1030.

At 1030 the node 110 transmits a ledger certificate validation chain to the end-user's device 270 over the TLS connection, comprising the plain ledger certificate 600, followed by the CA ledger certificate of the CA 205 and, if CA 205 is not a root ledger CA, by other CA ledger certificates as needed up to the self-issued certificate of a root ledger CA. Then process 1000 terminates.

Figure 11:
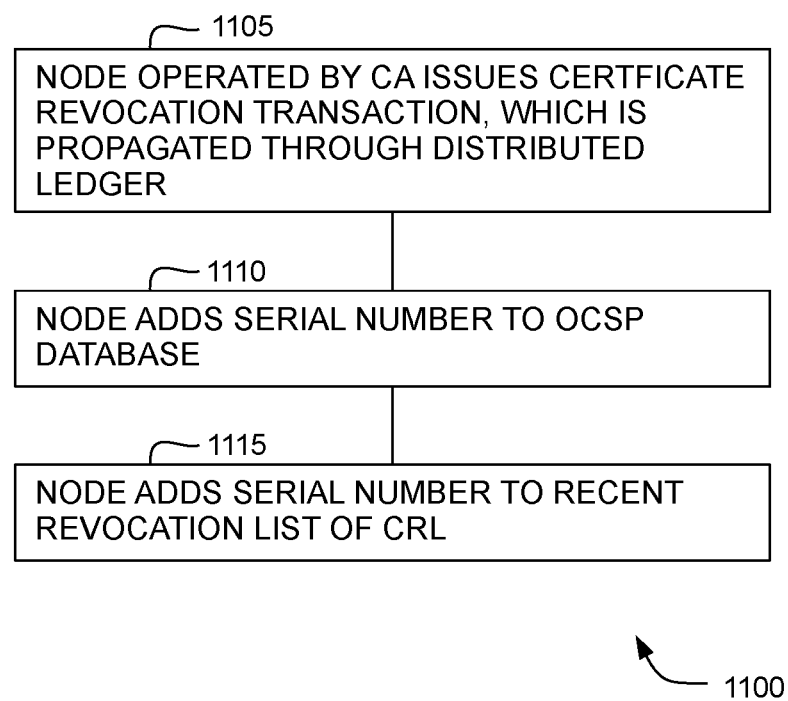
FIG. 11 is a flow diagram of a process followed by an on-ledger CA to revoke a rich ledger certificate.

FIG. 11 is a flow diagram illustrating a process 1100 followed by on-ledger CA 205 to revoke the ledger certificate 500 of FIG. 5, under the assumption that all the optional components of the certificate are included, i.e. that the certificate is bimodal.

At 1105 the node 110 operated by the CA 205, which is a node of the distributed ledger 100, issues a certificate revocation transaction, such as transaction 400 of FIG. 4, that contains an instruction to store the serial number of the ledger certificate in the certificate revocation store of the CA. Then the process continues at 1110.

At 1110 the node 110 adds the serial number of the ledger certificate to the database 260 used by the OCSP server 240 of the CA. Then the process continues at 1115.

At 1115 the node 110 adds the serial number of the ledger certificate to the RRL 255 of the CRL server 235 of the CA. This will cause the serial number to be included in the next version of the CRL update 250 and of the CRL 245. Then the process 1100 terminates.

Figure 12:
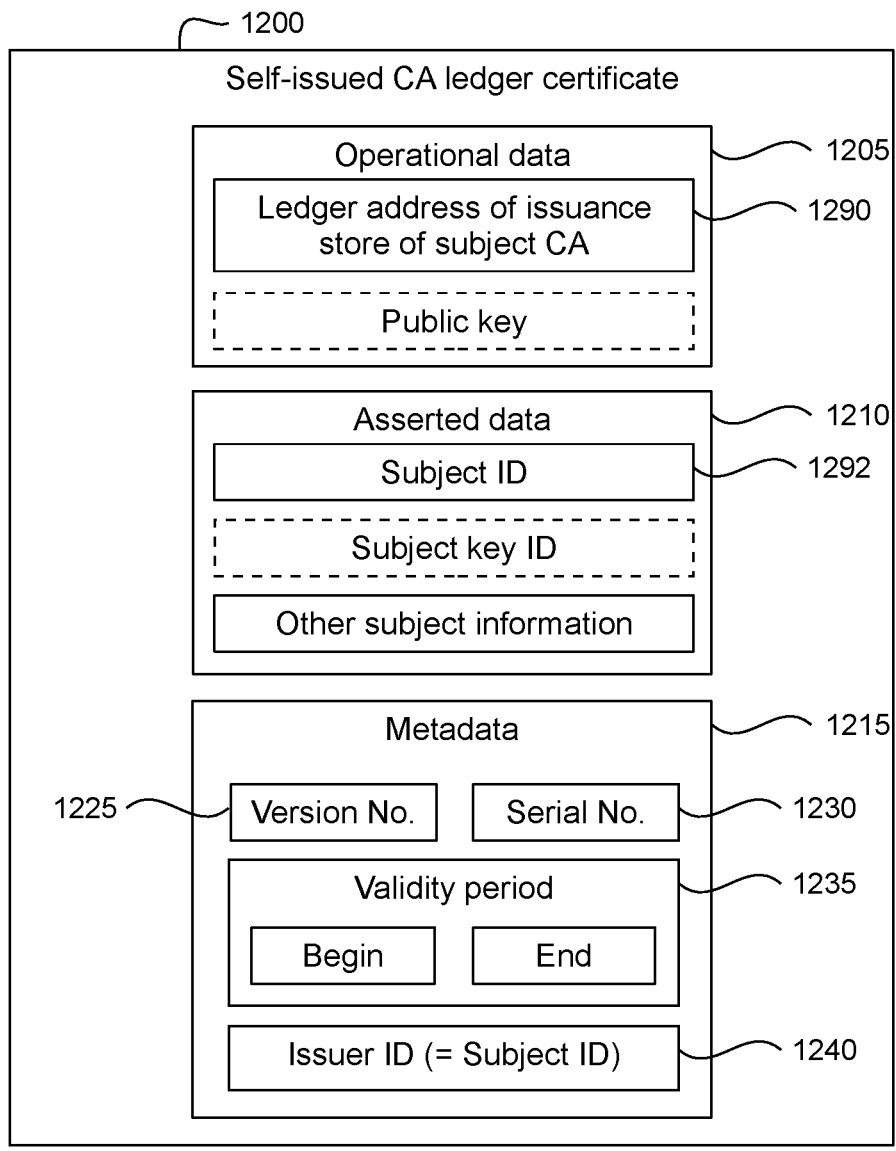
FIG. 12 is a block diagram illustrating a self-issued CA ledger certificate.

FIG. 12 is a block diagram illustrating a self-issued root ledger certificate 1200, which is assumed to have been issued to itself by the parent CA of the ledger CA 205, according to some embodiments. The issuer ID component 1240 has the same value as the subject ID component 1292, which identifies the parent CA of CA 205. The operational data 1205 and the asserted data 1210 are like those of an ordinary CA ledger certificate illustrated in FIG. 8. In the metadata 1215, the version No. 1225, the serial No. 1230 and the validity period 1235 are like those of an ordinary CA ledger certificate illustrated in FIG. 8. The signature cryptosystem ID, the issuer key ID, the CRL URL, the OCSP URL, the ledger address of the certificate revocation store, and the certificate signature are omitted. In alternative embodiments the root ledger CA may include those components in a ledger certificate that it issues to itself, with the same values that they would have if the certificate were issued to a child CA.

Figure 13:
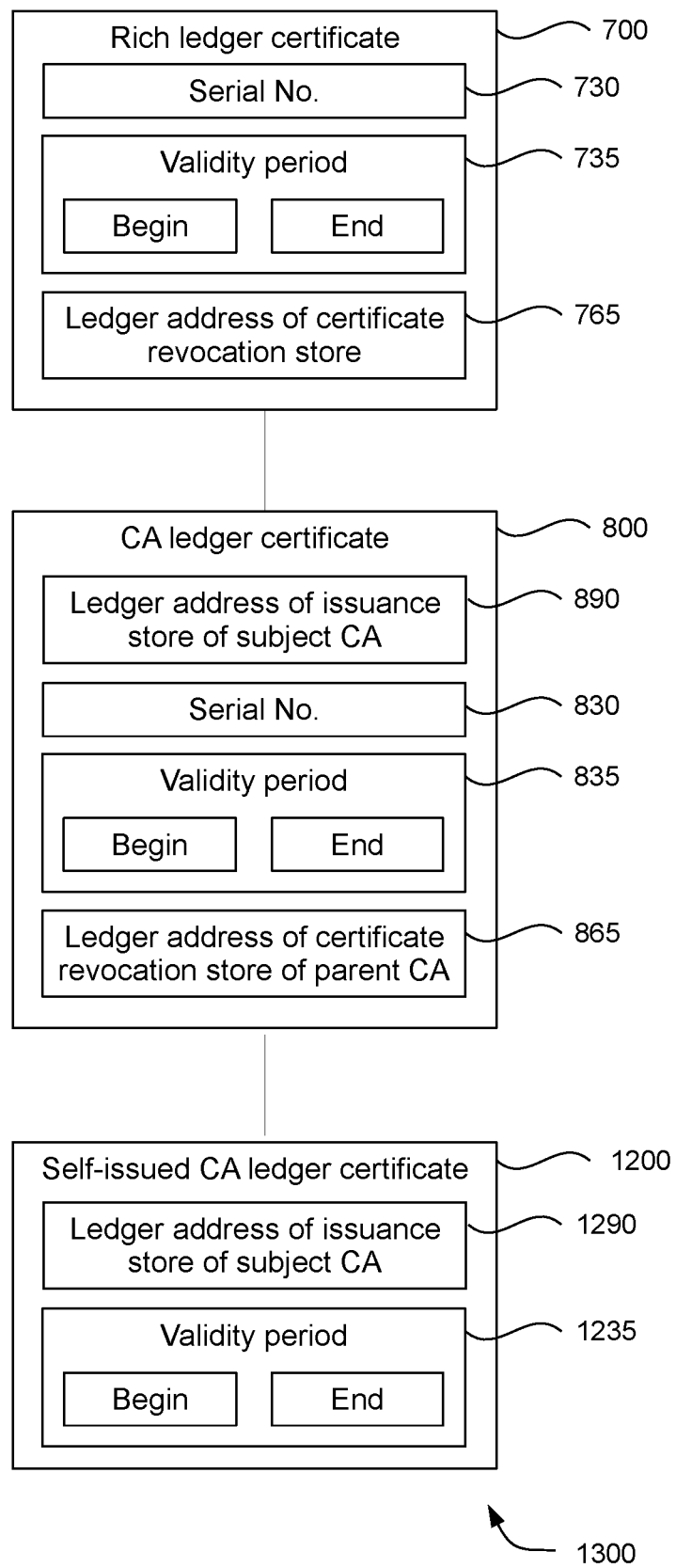
FIG. 13 is a block diagram illustrating a ledger certificate validation chain.

FIG. 13 is a block diagram illustrating the ledger certificate validation chain 1300 of the rich ledger certificate 700. It consists of the rich ledger certificate 700 of the end-subject 265, the CA ledger certificate 800 of the on-ledger CA 205, and the self-issued CA ledger certificate 1200 of the root ledger CA that is the parent of CA 205. FIG. 13 shows only the components of each certificate that are relevant to validation.

In some embodiments either all the ledger certificates of a ledger certificate validation chain are bimodal or they are all ledger-only. If they are bimodal each certificate but the last has an issuer ID and an issuer key ID that coincide with the subject ID and subject key ID of the next certificate respectively.

FIG. 14 is a flow diagram of a process 1400 by which on-ledger verifier 270, which operates node 130 of the distributed ledger 100, validates the end-subject ledger certificate 700, using the ledger certificate validation chain 1300 of FIG. 13.

At 1405 node 130 checks if the present time falls between the Begin and End times of the validity period 735 of certificate 700. If so, the process continues at 1410. If not, the process fails.

At 1410 node 130 checks if the serial number 730 of certificate 700 is present in the node's local replica 230 of the certificate revocation store of the CA 205, whose ledger address is component 765 of certificate 700. If so, the process fails. If not, the process continues at 1415.

At 1415 node 130 computes the validation hash of certificate 700 and checks if it is present in the node's local replica 225 of the certificate issuance store of the CA 205, whose ledger address is component 890 of the CA ledger certificate 800 of CA 205, which follows certificate 700 in the ledger certificate validation chain. If so, the process continues at 1420. If not, the process fails.

At 1420 node 130 checks if the present time falls between the Begin and End times of the validity period 835 of certificate 800. If so, the process continues at 1425. If not, the process fails.

At 1425 node 130 checks if the serial number 830 of certificate 800 is present in the node's local replica 230 of the certificate revocation store of the parent CA of the CA 205, whose ledger address is component 865 of certificate 800. If so, the process fails. If not, the process continues at 1430.

At 1430 node 130 computes the validation hash of certificate 800 and checks if it is present in the node's local replica 225 of the certificate issuance store of the parent CA of the CA 205, whose ledger address is component 1290 of the self-issued CA ledger certificate 1200 of the parent CA of CA 205, which follows certificate 800 in the ledger certificate validation chain. If so, the process continues at 1435. If not, the process fails.

At 1435 node 130 checks if the present time falls between the Begin and End times of the validity period 1235 of certificate 1200. If so, the process continues at 1440. If not, the process fails.

At 1440 node 130 checks if the self-issued CA ledger certificate 1200 is present in its root ledger certificate store 290. If so, the process terminates successfully. If not, the process fails.

Revocation of certificate 1200 is performed by removing it from the root ledger certificate store 290. In general, when a root ledger certificate needs to be revoked, an emergency procedure is used to notify all on-ledger and off-ledger verifiers, which remove it from their root ledger certificate stores.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of issuing a ledger certificate to a subject performed by a node of a distributed ledger operated by a certificate authority, the ledger certificate asserting attributes of the subject, one or more of the asserted attributes having been verified to the satisfaction of the certificate authority, the ledger certificate comprising a ledger address of an on-ledger certificate revocation store that enables an on-ledger verifier to validate the ledger certificate by verifying that a unique identifier of the ledger certificate is not present in a local replica of the on-ledger certificate revocation store, the method of issuing the ledger certificate comprising issuing a certificate issuance transaction on the distributed ledger, the certificate issuance transaction containing an instruction to store a validation hash of the ledger certificate in an on-ledger certificate issuance store, the instruction being executable by an on-ledger verifier in a local replica of the on-ledger certificate issuance store upon the certificate issuance transaction being propagated to the on-ledger verifier, wherein a ledger address of the on-ledger certificate issuance store is included in a parent certificate whose subject is the certificate authority.

2. The method of claim 1, wherein the subject is a human end-subject operating a personal computing device and the method further comprises transmitting a ledger certificate validation chain comprising the ledger certificate to the personal computing device.

3. The method of claim 1, wherein the subject is a human end-subject and one or more of the asserted attributes is verified in the course of an in-person visit by the end-subject to the certificate authority.

4. The method of claim 1, wherein the subject is a human end-subject and one or more of the asserted attributes is verified by a registration authority.

5. The method of claim 1, wherein the ledger certificate further comprises a Uniform Resource Locator of a Certificate Revocation List distribution point that enables an off-ledger verifier to check whether the ledger certificate has been revoked.

6. The method of claim 1, wherein the ledger certificate further comprises a Uniform Resource Locator of an Online Certificate Status Protocol responder that enables an off-ledger verifier to check whether the ledger certificate has been revoked.

7. The method of claim 6, wherein the ledger certificate is a Certificate Authority ledger certificate.

8. The method of claim 1, wherein the ledger certificate does not include a signature.

9. The method of claim 1, wherein the ledger certificate includes a signature that enables an off-ledger verifier to verify that it has been issued by the certificate authority.

10. The method of claim 1, wherein the ledger certificate is a rich ledger certificate.

* * * * *